United States Patent [19]

Bartz

[11] 4,309,260
[45] Jan. 5, 1982

[54] HEAT-CURABLE AQUEOUS COATING COMPOSITIONS

[75] Inventor: Wilfried Bartz, Marl, Fed. Rep. of Germany

[73] Assignee: Chemische Werke Huels, AG, Marl, Fed. Rep. of Germany

[21] Appl. No.: 205,129

[22] Filed: Nov. 10, 1980

[30] Foreign Application Priority Data

Nov. 10, 1979 [DE] Fed. Rep. of Germany ....... 2945459

[51] Int. Cl.$^3$ .............................................. C25D 13/00
[52] U.S. Cl. .............................. 204/181 R; 260/29.3; 260/29.7 NR; 260/29.4 UA; 525/66; 525/68; 525/139; 525/163
[58] Field of Search ...... 260/29.3, 29.7 NR, 29.4 UA; 204/181 R; 525/66, 68, 124, 130, 139, 143, 163, 285, 298

[56] References Cited

U.S. PATENT DOCUMENTS 3,658,795  4/1972  Daimer ................................. 260/839
3,796,770  3/1974  Daimer et al. ...................... 260/839
4,111,872  9/1978  Dworak ........................... 204/181 R

OTHER PUBLICATIONS

Encyclopedia of Polymer Science and Technology, Plastics, Resins, Rubbers, Fibers, vol. 11, 1969, John Wiley & Sons, p. 280.

Primary Examiner—Joseph L. Schofer
Assistant Examiner—Bernard Lipman
Attorney, Agent, or Firm—Millen & White

[57] ABSTRACT

A binder for a heat-curable aqueous coating composition for metallic surfaces comprises:

(A) 60-95% by weight of a water-soluble and/or water-dispersible addition compound of 10-35% by weight of one or more α,β-unsaturated dicarboxylic acids and 65-90% by weight of a butadiene polymer which is liquid at 20° C., contains at least 50 mole % of butadiene units and has a molecular weight of 500 to 6,000, the addition compound being at least partially neutralized with a basic compound and partially esterified, and (B) 5-40% by weight of a water-soluble and/or water-dispersible crosslinking resin having, on the average, at least 2 chemically different reactive groups per mole, wherein the addition compound (A) is esterified to 10-70 equivalent percent, based on its acid number, with one or more unsaturated alcohols of the formula

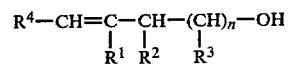

and wherein at least one of the reactive groups of the crosslinking resin (B) is of formula II

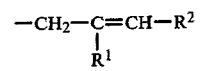

II wherein, for both formulae I and II, $R^1$, $R^2$ and $R^3$ can be identical or different and each independently is hydrogen or methyl, $R^4$ is hydrogen or $C_{1\text{-}5}$-alkyl, and n is 0 or 1.

11 Claims, No Drawings

HEAT-CURABLE AQUEOUS COATING COMPOSITIONS

BACKGROUND OF THE INVENTION

The present invention relates to heat-curable aqueous coating compositions for use on metallic surfaces.

Such compositions are based on a mixture of a binder and various optional ingredients such as organic solvents, pigments, fillers, the customary auxiliary agents and additives etc. The binder in the compositions of interest comprises:

(A) 60–95% by weight of a water-soluble and/or water-dispersible addition compound of 10–35% by weight of one or several $\alpha,\beta$-unsaturated dicarboxylic acids and 65–90% by weight of a butadiene polymer liquid at 20° and having at least 50 mole% of butadiene units and a molecular weight in the range of 400 to 6,000, the addition compound being at least partially neutralizable with basic compounds and esterified, and (B) 5–40% by weight of a water-soluble and/or water-dispersible crosslinking resin having, on the average, at least 2 reactive groups per mole.

Such coating compositions are conventional and disclosed, e.g., in DAS [German Published Application] 2,120,962 and DOS [German Unexamined Laid-Open Application] 1,720,576. Although possessing generally acknowledged advantages, the aforementioned binders also exhibit specific deficiencies regarding their processing and/or attainable film properties. Thus, by combining heat-reactive formaldehyde resins of phenolcarboxylic acids with partially esterified, carboxy-group-carrying butadiene polymers, aqueous coating compositions can be obtained having a good stability during storage and application procedure and which produce coatings having increased hardness. However, in combination with binders based on polybutadienes of a high cis-1,4-content, which offer good corrosion protection when used alone as binders, these crosslinking resins result, with increasing amounts, in a rising rust undermining of the coated films in the salt spray test.

SUMMARY OF THE INVENTION

Accordingly, it is an object of this invention to provide coating compositions which avoid the aforedescribed disadvantages while retaining the good general properties for which such compositions are known.

Upon further study of the specification and appended claims, further objects and advantages of this invention will become apparent to those skilled in the art.

These objects have been attained by providing such compositions wherein the addition compound (A) is esterified to an extent of 10–70 equivalent percent, based on its acid number, with one or several alcohols of formula I

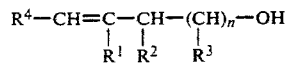

and wherein at least one of the reactive groups of the crosslinking resin (B) is of formula II

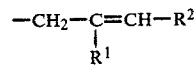

wherein, in formulae I and II, $R^1$, $R^2$ and $R^3$ are identical or different and each independently is hydrogen or methyl, $R^4$ is hydrogen or alkyl of 1–5 carbon atoms, and n is 0 or 1.

DETAILED DESCRIPTION

Unless indicated otherwise herein, details of the conventional portion of the binders of this invention and their preparation are well known or readily determinable by routine experiments, e.g., as disclosed in DAS 2,120,962 and DOS 1,720,576, whose disclosures are incorporated by reference herein. For the purposes of this invention, acid numbers are determined by titration with KOH in pyridine/water.

Especially suitable unsaturated alcohols for use in component (A) of the coating compositions of this invention include, for example, allyl alcohol, methallyl alcohol, crotyl alcohol, 1-buten-3-ol, 2-ethyl-2-hexen-1-ol, etc. These alcohols can be used alone or in mixtures. Preferably, the esterified addition products (A) have a degree of esterification of 25–45 equivalent percent.

In addition to the unsaturated alcohols of this invention, saturated alcohols can also be employed, e.g., saturated hydrocarbon or alkoxy substituted hydrocarbon-alcohols of 1–8 C atoms or benzyl alcohol. Examples of such alcohols include methanol, ethanol, propanols, butanols, ethylene glycol monoalkyl ethers of 1–4 carbon atoms in the alkyl residue etc. Preferred unsaturated alcohols of this invention as well as preferred saturated alcohols which can be used additionally, are those which possess primary hydroxy groups.

The basic polymers used for the production of the addition compound of component (A) are conventional butadiene homo- and/or copolymers. Suitable comonomers include, in particular, other conjugated diolefins, such as, for example, 1,3-pentadiene, isoprene and similar compounds. Furthermore, aliphatic monoolefins, such as ethylene, propylene or aromatic vinyl compounds, e.g. styrene, can be utilized as comonomers in amounts of up to 30 mole%. The basic polymers contain at least 50 mole%, preferably at least 70 mole%, and especially at least 90 mole% of butadiene units. Binders containing homopolybutadiene as the polymer are especially suitable for the coating compositions of this invention. The molecular weights of the basic polymers range from 400 to 6,000, preferably from 700 to 5,000, or, when butadiene homopolymers are used, are in the preferred range of 850 to 5,000. The molecular weights are determined by vapor pressure osmometry.

Within the scope of this invention, the base polymers are preferably butadiene polymers wherein at least 30%, preferably more than 40%, of the existing double bonds are 1,4-double bonds. Among these, those polymers are preferred wherein at least 20% of the total double bonds present exist in the form of cis-1,4-double bonds. For butadiene polymers wherein the proportion of vinyl-type double bonds is at most 40%, the proportion of cis-1,4-double bonds is to be at least 30%.

The addition compound is obtained by chemical addition of $\alpha,\beta$-unsaturated dicarboxylic acids to the butadiene polymers. Such processes, as well as the dicarboxylic acids which are suitable for this purpose, are fully conventional and basically known from the state of the art (DOS 2,627,635 whose disclosure is incorporated by reference herein).

The α,β-unsaturated dicarboxylic acids can be of the formula

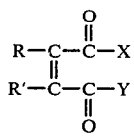

wherein R and R' are an H atom, a halogen atom or an alkyl group; X and Y are a hydroxy group, an alkoxy group or an oxygen bond which is formed of X and Y together, assuming that X and Y are not simultaneously an alkoxy group. Advantageous α,β-unsaturated dicarboxylic acids have 8 carbon atoms or less, such as, for example, maleic acid, chloromaleic acid, fumaric acid, citraconic acid, 1,2-diethylmaleic acid, etc. Instead of the free dicarboxylic acids, the corresponding acid anhydrides are preferably employed. Especially preferred is maleic anhydride, preferably in amounts of 12–25% by weight.

The partial esterification of the aforedescribed addition compounds is especially advantageous and simple from a technical and industrial viewpoint if the starting material compounds having the di-acid function to be esterified are present in the anhydride form. The esterification can then be conducted under gentle conditions, optionally in the presence of small amounts of the customary alkaline or acidic catalysts, in the presence of the unsaturated alcohols of this invention as well as the optional saturated alcohols, thereby forming acidic monoesters (half esters). The esterification is carried out conventionally, e.g., analogous to the procedures of U.S. Pat. No. 3,796,770 whose disclosure is incorporated by reference herein.

If, after the esterification reaction, marked amounts of unreacted anhydride groups remain in the addition compound, it is advisable to hydrolyze them to the free carboxy groups, if appropriate, after the below described binder precondensation, prior to neutralization, in a conventional manner. This measure is particularly indicated when, for the neutralization, organic bases are used which can react with anhydride groups forming covalent bonds.

The partially esterified addition compound of component (A) must, however, still exhibit a sufficiently high residual acid number to possess sufficient water solubility and/or dispersing capacity after the neutralization. This requirement is met in most cases with residual acid numbers of ≧40 mg KOH/g. To attain good processability and considering the special requirements of the preferred dip-electrocoating application, those products are preferred which have acid numbers of 40–150, especially of 60–120 mg KOH/g.

The partially esterified addition compounds of butadiene polymers and α,β-unsaturated dicarboxylic acids can be rendered water-soluble or water-dispersible using prior-art methods. (See, e.g., U.S. Pat. Nos. 3,518,213 or 3,654,203 whose disclosure is incorporated by reference herein.) This is done by at least partially neutralizing the addition compounds with ammonia or another alkaline compound, such as, for example, an organic amine or an inorganic alkali compound. Examples of suitable alkaline compounds include: methylamine, ethylamine, ethylmethylamine, dimethylamine, diethylamine, trimethylamine, triethylamine; mono-, di-, or tributylamines; mono-, di-, or triethanolamines; N,N-diethylethanolamine, N,N-dimethylethanolamine, N-methylmorpholine, sodium hydroxide, potassium hydroxide, ammonium carbonate, etc.

To obtain sufficient water solubility or dispersing capacity of the aforedescribed binders in water, the amount of alkaline compounds added must be chosen to be adequately high. The higher the residual acid number of the addition products, the lower are the degrees of neutralization permissible for attaining the desired effect. The minimum amount required is normally 0.3–0.5 equivalents of base per residual acid equivalent. However, for the binders of this invention, there is no reason adverse to the use of even super-stoichiometric amounts, for example, 1.5–2.0 equivalents, of base per acid equivalent. Thus, a person skilled in the art is able to vary the resultant properties within a wide range by varying the degree of neutralization in order to achieve characteristics desirable for a given use. Thus, the coating compositions can be optimally adapted to the particular apparatus conditions and existing application problems and requirements, for example anodic deposition. Preferably, however, the alkaline compounds are used in amounts less than stoichiometric. Degrees of neutralization of 0.5–0.8 equivalent of base/acid equivalent have proved to be favorable.

The thus-neutralized binders are dilutable with water to an unlimited extent. However, it has been found under practical conditions that the addition of organic solvents or solvent mixtures makes it easier to process the binders and increases the stability of the aqueous coating compositions and/or improves the flow properties of the not yet baked coatings. These measures are basically known to those skilled in the art and can be accomplished using known procedures and solvents such as those disclosed in British Pat. No. 1,102,652 or U.S. Pat. No. 3,519,213 which is incorporated by reference herein. Examples of solvents suitable for the aforementioned purpose include isopropanol, butanols, diacetone alcohols, alkyl "Cellosolves", dimethyl ethers of glycols etc. These solvents can be utilized in amounts of up to 100 parts by weight, preferably of 5–50 parts by weight per 100 parts by weight of binder. The solvents are normally added before, during or after the neutralization stage. If inert solvents are involved, it is occasionally even advantageous to add them to the addition compounds prior to the esterification.

Within the scope of this invention, component (A) is utilized in combination with water-soluble and/or water-dispersible crosslinking resins. Suitable resins which react in such mixtures upon heating, thereby forming a three-dimensional network, belong, for example, to the conventional binder classes of the phenolic resins, amino resins and isocyanate resins. Their preparation and use have been described, for example, in H. Kittel, "Lehrbuch der Lacke und Beschichtungen" [Varnish and Coating Textbook], A. W. Colomb publishers in Heenemann GmbH, Stuttgart-Berlin; D. H. Parker, Principles of Surface Coating Technology, Interscience Publishers, New York-London-Sydney, 1965; Encyclopedia of Polymer Science and Technology, Interscience Publishers, New York-London-Sydney, 1965–1972; Kirk-Othmer, Encyclopedia of Chemical Technology, vol. 3, John Wiley & Sons, New York-Chichester-Brisbane-Toronto, 3rd ed., 1979, the disclosures of all of which are incorporated by reference herein.

According to this invention, water-soluble and/or water-dispersible crosslinking resins are utilized as component (B) of the binder. These contain at least 2 chemically different reactive groups. The total number of reactive groups per mole is, on the average, at least 2. Preferred are those crosslinking resins which contain on the average more than 2.5, especially at least 3, reactive groups per mole. Among these, at least one reactive group per mole should correspond to formula II

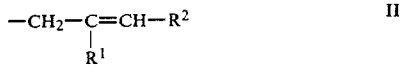

The substituents $R^1$ and $R^2$, as mentioned, can be identical or different and represent hydrogen or methyl.

In addition to the reactive groups of formula II, there should also be present at least one other reactive group. Suitable for this purpose within the scope of this invention are, for example, methylol and/or alkoxymethyl groups of optionally modified, crosslinkable aminoplasts and phenolic resins, conventionally producible by the reaction of aldehydes, especially formaldehyde, with amino compounds, e.g. urea or aminotriazines, and/or with phenolic compounds, such as phenolcarboxylic acids. (See, for example, in H. Kittel, "Lehrbuch der Lacke und Beschichtungen" [Varnish and Coating Textbook], A. W. Colomb publishers in Heenemann GmbH, Stuttgart-Berlin; D. H. Parker, Principles of Surface Coating Technology, Interscience Publishers, New York-London-Sydney, 1965; Encyclopedia of Polymer Science and Technology, Interscience Publishers, New York-London-Sydney, 1965–1972; Kirk-Othmer, Encyclopedia of Chemical Technology, vol. 3, John Wiley & Sons, New York-Chichester-Brisbane-Toronto, 3rd ed., 1979, whose disclosures are incorporated by reference herein.) Furthermore suitable as reactive groups are blocked isocyanate groups. Corresponding compounds can be prepared according to conventional processes, for example, by reacting isocyanate-group-containing crosslinking resins with suitable blocking compounds, e.g. caprolactam, phenol, or aliphatic hydroxy compounds, such as 2-ethylhexanol.

When the crosslinking resin itself carries acidic groups, for example carboxy groups, it is necessary to determine whether the amount of alkaline compound introduced for component (A) will be sufficient to ensure the water-dilutability of the total binder. If necessary, the quantity of alkaline compound must be increased accordingly.

For component (B), especially advantageous have proved to be phenolic resins of the resol type, the phenolic hydroxy groups of which are etherified with allyl alcohol to an extent of 50–100%. These are commercial products; their preparation is described, for example, in U.S. Pat. No. 2,579,330.

The binders of this invention contain component (A) in an amount of 60–95% by weight, preferably 70–90% by weight, and component (B) in an amount of 5–40% by weight, preferably 10–30% by weight. In this connection, the sum total of unsaturated structural elements of formulae I and II in the binder of this invention should amount, preferably, to at least 0.5 mole per kg of binder.

In addition to the crosslinking resins of this invention, it is also possible to concomitantly utilize other binders acting as crosslinking agents, such as, for example, water-soluble and/or water-dispersible aminoplasts or phenolic resins customary in the "electrocoating" sector in amounts of at most 50% by weight, based on the amount of component (B).

The total quantity of crosslinking resins is not to exceed 45% by weight, preferably 35% by weight, based on the total weight of all binders. In addition, up to 30% by weight of component (A) can be substituted by other customary, water-soluble or water-dispersible, carboxy-group-containing resins lending themselves to anodic dip-electrocoating, for example those based on hydrocarbon resins, diene (co-) polymers, or epoxy ester resins. The proportion of components (A) and (B) in the total binder, however, is not to fall below 65% by weight, preferably 75% by weight.

Components (A) and (B) of the binders of this invention and any optional additional foreign resins can be processed to form the desired coating compositions by physical mixing. In many cases, especially when using resins having a relatively low molecular weight and/or a low inherent viscosity, it is advantageous, prior to further processing, to subject the mixture to a precondensation at an elevated temperature, for example at 70° C. to 150° C. As compared to the physical mixtures, such precondensates normally exhibit improved properties for their use in painting technology, for example, an improved electrophoretic deposition behavior and an improved binder and pigment compatibility.

As is usual, the coating compositions of this invention can also contain pigments, fillers, stabilizers, as well as other customary auxiliary agents and additives in conventional amounts for the conventional purposes.

The coating compositions of this invention are suitable primarily for anodic dip-electrocoating of metallic materials, especially steel. For this application, they are generally formulated at a solids content of 1–30% by weight, preferably 5–20% by weight. For purposes of electrophoretic deposition, voltages can be applied in the range of from 10 to 500 volts, preferably 50 to 300 volts. The bath temperatures should be in the range of 10° to 40° C., preferably 20°–30° C. However, they can also be applied according to other conventional methods, such as dipping, spraying or flooding. In these cases, higher solids contents of, for example, 40–60% by weight are possible, depending on the application method.

The coating compositions of this invention are generally baked at temperatures in the range of 120° to 250°, preferably 140° to 190° C., within 10–60 minutes, preferably 15–40 minutes. The aqueous coating compositions of this invention exhibit an excellent shelf stability. They are equal in this respect to the customary coating compositions of the prior art which are based on butadiene polymers. The coatings obtained by means of the coating compositions of this invention possess good general properties, such as hardness, elasticity and waterproofness, and a simultaneously excellent corrosion protection. This is a combination of properties which is not attained by the comparable coating compositions of the state of the art.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example(s), all temperatures are set forth uncorrected in degrees Celsius; unless otherwise indicated, all parts and percentages are by weight.

EXAMPLES

(A) Basic Polymers

The following basic polymers (1) through (4) were used for preparing component (A) of the coating compositions of this invention:

(1) Homopolybutadiene (iodine number according to Wijs: 445; 1,4-cis: 1,4-trans: vinyl=73: 25: 2; molecular weight: 1,700; viscosity/20° C.: 0.8 Pa.s).

(2) Homopolybutadiene (iodine number according to Wijs: 435; 1,4-cis: 1,4-trans:vinyl=52: 11: 37; molecular weight: 1,600; viscosity/20° C.: 1.2 Pa.s).

(3) Homopolybutadiene (iodine number according to Wijs: 446; 1,4-cis: 1,4-trans:vinyl=33: 47: 20; molecular weight: 4,540; viscosity/20° C.: 3.9 Pa.s).

(4) Homopolybutadiene (iodine number according to Wijs: 436; 1,4-cis:1,4-trans:vinyl=51: 14: 35; molecular weight: 1,500; viscosity/20° C.: 1.0 Pa.s).

(B) Preparation of the Esterified Addition Compounds (1) 2,451 g of the basic polymer A(1) and 549 g of maleic anhydride (MA) were reacted in the presence of 3 ml of acetylacetone and 36 g of Cu naphthenate solution (10% Cu) under nitrogen in an agitated vessel for 1 hour at 180° C. and then for 3 hours at 190° C. The MA adduct contained ≦0.1% by weight of free MA and had an acid number of 167 mg KOH/g (titrated with KOH in pyridine/water). 900 g of the MA adduct was esterified with 70 g of allyl alcohol in the presence of 2 g of triethylamine for a period of 1 hour at 80° C., then for 2 hours at 90° C., and finally for 1 hour at 100° C. Product B(1) had an acid number of 95 mg KOH/g. The degree of esterification, based on the acid number of the MA adduct, was 40 equivalent percent.

(2) 900 g of the above-described MA adduct was esterified analogously, first with 38.9 g of allyl alcohol up to an acid number of 122 mg KOH/g, corresponding to 24% esterification, and subsequently with 25.7 g of methanol. The final acid number of B(2) was 92 mg KOH/g, corresponding to a total degree of esterification of 41 equivalent percent.

(3) 900 g of the MA adduct corresponding to B(1) was reacted with 87 g of crotyl alcohol in the presence of 3 g of triethylamine for 1 hour at 80° C., for 2 hours at 90° C., and finally for 2 hours at 100° C. The acid number of product B(3) was 90 mg KOH/g, corresponding to a degree of esterification of 40 equivalent percent.

(4) 1,225.5 g of the basic polymer A(2), 274.5 g of MA, and 0.45 g of N,N'-diphenyl-p-phenylenediamine were heated for 1 hour to 180° C. and then for 3 hours to 190° C. under nitrogen. The content of free MA in the reaction product was less than 0.1% by weight; the acid number was determined to be 190 mg KOH/g. 1,400 g of the thus-obtained adduct was diluted at 60° C. with 173 g of diacetone alcohol, and 154 g of methallyl alcohol and 5 g of triethylamine were added dropwise to the solution. After a reaction time of 2 hours at 90° C. and 2 hours at 100° C., the mixture had an acid number of 104 mg KOH/g, based on the binder. The degree of esterification was calculated as 40 equivalent percent.

(5) In correspondence with the modes of operation indicated in (B), the biners B(5) through B(8), as well as X, were produced as listed in Table 1.

(C) Preparation of Coating Compositions and Coatings

EXAMPLE 1

A mixture of 340 g of the 90% solution of product B(4) in diacetone alcohol, 54 g of a commercial allyl-group-containing phenolic resin ("METHYLON" resin 75108) and 120.3 g of diacetone alcohol was precondensed for 2 hours at 100° C. 57.6 g of $TiO_2$, 46.8 g of kaolinite, and 3.6 g of carbon black were stirred into the resultant precondensate solution, and this mixture was ground. 450 g of paste was stirred together with 83.7 g of 5% aqueous ammonia, and then the volume was replenished to 2,603 g with fully demineralized water. Binder content: 10% by weight (85% by weight of component A and 15% by weight of component B); pigment content: 30% by weight, based on the binder; pH value: 7.2.

After allowing the coating composition to age for 48 hours at 40° C., a film could be deposited within 2 minutes on a zinc-phosphated steel sheet connected as the anode at a bath temperature of 25° C. and an applied voltage of 140 volts.

TABLE 1

Characteristic Data According to B(5)
(Weight Ratio Basic Polymer:MA = 81.7:18.3)

| Addition Compound No. | Basic Polymer | Alcohol | Degree of Esterification(*) [%] | Acid Number [mg KOH/g] |
|---|---|---|---|---|
| B(5) | A(1) | 1-Buten-3-ol | 33 | 104 |
| B(6) | A(2) | Allyl Alcohol | 40 | 104 |
| B(7) | A(3) | Allyl Alcohol | 40 | 107 |
| B(8) | A(4) | Allyl Alcohol | 33 | 111 |
| X | A(3) | Methanol | 44 | 105 |

After rinsing with fully demineralized water and baking at 180° C./20 minutes, this film resulted in an elastic coating free of surface imperfections with a layer thickness of 25 μm.

EXAMPLES 2-8 and A-D

Corresponding to Example 1, aqueous coating compositions were prepared and anodically deposited coatings were produced (25 μm dry layer thickness).

TABLE 2

Blister Formation in Salt Spray Test
(ASTM B 117 35° C., 5% NaCl Solution)

| Example No. | Addition Compound No. | Additional Resin, % by Weight (Based on Total Binder) | Salt Spray Test [h]/Amount of Blisters of a Size ≧ g 2(**) |
|---|---|---|---|
| A | B(1) | 15 R(*) | 750/m 3 |
| 2 | B(1) | 15 AR(*) | 750/m 1 |
| 3 | B(1) | 25 AR | >1,000/m 0 |
| 4 | B(3) | 15 AR | 750/m 1-2 |
| 5 | B(5) | 15 AR | 750/m 1-2 |
| 6 | B(8) | 15 AR | 750/m 1-2 |
| 7 | B(2) | 15 AR | >1,000/m 0 |
| 8 | B(7) | 15 AR | 750/m 1(****) |
| B | B(7) | — | 500/m 2 |
| C | X | — | 240/m 1-2(***) |

TABLE 2-continued

Blister Formation in Salt Spray Test
(ASTM B 117 35° C., 5% NaCl Solution)

| Example No. | Addition Compound No. | Additional Resin, % by Weight (Based on Total Binder) | Salt Spray Test [h]/Amount of Blisters of a Size ≧ g 2(**) |
|---|---|---|---|
| D | X | 15 AR | 500/m 2(*****) |

(*)AR = allyl-etherified phenolic resin of the resol type ("METHYLON" resin 75108)
R = phenolic resin of the resolcarboxylic acid type
(**)Listing includes duration [h] of the salt spray test until blisters having a size of ≧ g 2 occur, as well as their amount [m] up to this point in time. Evaluation of the blisters is effected according to DIN [German Industrial Standard] 53 209. Evaluation cycle: 168-240-336-500-750-1,000 h.
(***)After 500 h crack formation and extensive loss of adhesion.
(****)After 1,000 h: m 2-3, good residual adhesion.
(*****)After 750 h brittleness occurs, crack formation and extensive loss of adhesion are observed.

TABLE 3

Blister Formation Upon Storage in Fully Demineralized Water at 40° C., Measured on 25 μ Films

| Example No. | Addition Compound No. | Days Until Blisters Occur >g 2/amount (1) | Tear-Off (2) (% of Area) |
|---|---|---|---|
| 8 | B(7) | >14/m 0 | 0 |
| B | B(7) | 7/m 4 | about 10 |
| C | X | 2/m 5 | about 80 |
| D | X | 4/m 5 | about 30 |

(1) Evaluation of the blisters according to DIN 53 209; conductance of test analogously to ISO 1521: the painted metal sheets were placed in fully demineralized water so that they were half submerged, in a glass container provided with a lid; testing temperature 40 ± 1° C. Evaluation was done after 2, 4, 7, 9, and 14 days, on the immersed surface area as well as on the surface area in the vapor space.
(2) 1 h after taking the sheets out of the water upon termination of the test (14 days) and storage at room climate conditions, the adhesion is tested by tearing off with a 50 mm crepe tape.

EXAMPLE 9

306 g of product B(6), 54 g of the commercial phenolic resin according to Example 1, and 154.3 g of diacetone alcohol were mixed together and pretreated for 4 hours at 100° C. After cooling, 90 g of micronized talc, 14.4 g of rutile, and 3.6 g of carbon black were added, and the mixture was ground on a three-roller mill. 452 g of the thus-obtained paste was combined with 150 g of water and 30 g of 15% ammonia. After 20 minutes of intense mixing, the volume was replenished with water to 1,983 g. The aqueous coating composition had a pH of 7.5.

At 140 volts, 25μ films were deposited on zincphosphated steel sheet and baked at 180° C./20 minutes. In a salt spray test according to ASTM B 117, these films showed, after 1,008 hours, neither blister nor crack formation nor any loss of adhesion; the corrosive undermining of the enamel coating, starting from a cut applied prior to testing down to the mere metal, was after 1,008 hours, on the average, 1 mm; its maximum value was 2 mm.

Corresponding test sheets, subjected initially for 24 hours to a salt spray test and then for 1,000 hours to a tropical test, showed no blister formation or filiform corrosion whatever.

Tests characterized by letters are not in accordance with the invention.

The preceding example(s) can be repeated with similar success by substituting the generically or specifically described reactants and/or operating conditions of this invention for those used in the preceding example(s).

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A binder for a heat-curable aqueous coating composition for metallic surfaces comprising:
   (A) 60-95% by weight of a water-soluble and/or water-dispersible addition compound of
       10-35% by weight of one or more α,β-unsaturated dicarboxylic acids have up to 8 carbon atoms and the formula $$\begin{array}{c} O \\ \parallel \\ R-C-C-X \\ \parallel \\ R'-C-C-Y \\ \parallel \\ O \end{array}$$

wherein R and R' are an H atom, a halogen atom or an alkyl group; X and Y are a hydroxy group, an alkoxy group or an oxygen bond which is formed of X and Y together, assuming that X and Y are not simultaneously an alkoxy group; and
       65-90% by weight of a butadiene polymer which is liquid at 20° C., contains at least 50 mole% of butadiene units and has a molecular weight of 400 to 6,000,
       the addition compound being at least partially neutralized with a basic compound and partially esterified, and
   (B) 5-40% by weight of a water-soluble and/or waterdispersible crosslinking resin having, on the average, at least 2 chemically different reactive groups per mole,
   wherein the addition compound (A) is esterified to 10-70 equivalent percent, based on its acid number, with one or more unsaturated alcohols of the formula $$R^4-CH=C-CH-(CH)_n-OH \atop \begin{array}{ccc} | & | & | \\ R^1 & R^2 & R^3 \end{array}$$

and wherein at least one of the reactive groups of the crosslinking resin (B) is of formula II $$-CH_2-C=CH-R^2 \atop \begin{array}{c} | \\ R^1 \end{array} \qquad (II)$$

and at least one reactive group is a reactive group of a conventional, crosslinkable, phenolic resin, amino resin or isocyanate resin,
   wherein for both formulae I and II,
   $R^1$, $R^2$ and $R^3$ can be identical or different and each independently is hydrogen or methyl,
   $R^4$ is hydrogen or $C_{1-5}$-alkyl, and n is 0 or 1.

2. A binder of claim 1 wherein in addition to said unsaturated esterifying alcohol of said formula, addition compound (A) is also esterified with a saturated alcohol.

3. A binder of claim 1 wherein the butadiene polymer of component (A) is homopolybutadiene.

4. A binder of claim 1 wherein the degree of neutralization of the addition compound (A) is 0.3–0.8 equivalent of base per acid equivalent.

5. A binder of claim 1, wherein the crosslinking resin (B) is a resol-type condensation product of a phenol and formaldehyde, the phenolic hydroxy groups of which are etherified with allyl alcohol to an extent of 50–100%.

6. A heat-curable aqueous coating composition for metallic surfaces comprising a binder of claim 1 and water.

7. A coating composition of claim 6 further comprising an organic solvent.

8. A coating composition of claim 7 further comprising a pigment, a filler or another adjuvant conventional for such coating compositions.

9. A coating composition of claim 6 wherein the crosslinking resin (B) is a resol-type condensation product of a phenol and formaldehyde, the phenolic hydroxy groups of which are etherified with allyl alcohol to an extent of 50–100%.

10. A method of anodic dip-electrocoating a metallic surface which comprises anodic dip-electrocoating the surface using a coating composition of claim 6.

11. A method of claim 10 further comprising heat curing the coating on the metallic surface after it has been dip-electrocoated.

* * * * *